US012045816B2

(12) United States Patent
Miller et al.

(10) Patent No.: US 12,045,816 B2
(45) Date of Patent: *Jul. 23, 2024

(54) AUTHENTICATION QUESTION TOPIC EXCLUSION BASED ON RESPONSE HESITATION

(71) Applicant: Capital One Services, LLC, McLean, VA (US)

(72) Inventors: Daniel Miller, Brooklyn, NY (US); Vyjayanthi Vadrevu, Pflugerville, TX (US); Viraj Chaudhary, Katy, TX (US); Samuel Rapowitz, Roswell, GA (US); Jenny Melendez, Falls Church, VA (US); Tyler Maiman, Melville, NY (US); David Septimus, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,013

(22) Filed: Apr. 20, 2023

(65) Prior Publication Data
US 2023/0259937 A1 Aug. 17, 2023

Related U.S. Application Data

(63) Continuation of application No. 17/368,188, filed on Jul. 6, 2021, now Pat. No. 11,663,598.

(51) Int. Cl.
H04L 29/06 (2006.01)
G06F 21/60 (2013.01)
(Continued)

(52) U.S. Cl.
CPC ......... *G06Q 20/401* (2013.01); *G06F 21/604* (2013.01); *G06F 21/62* (2013.01); *H04L 63/0853* (2013.01); *H04L 63/10* (2013.01)

(58) Field of Classification Search
CPC ......... G06F 21/604; G06F 21/62; H04L 63/10
See application file for complete search history.

(56) References Cited

U.S. PATENT DOCUMENTS

2003/0154406 A1 8/2003 Honarvar et al.
2004/0177120 A1* 9/2004 Kirsch .................. H04L 51/212
709/206

(Continued)

OTHER PUBLICATIONS

Nov. 10, 2022—(WO) International Search Report and Written Opinion—App No. PCT/US2022/035949.

*Primary Examiner* — Jason K Gee
(74) *Attorney, Agent, or Firm* — Banner & Witcoff, Ltd.

(57) ABSTRACT

Methods, systems, and apparatuses are described herein for improving computer authentication processes by analyzing user response times to authentication questions. A request for access to an account may be received. Transaction data associated with a user of that account may be retrieved, and a list of merchants may be generated based on the transaction data. A blocklist may be retrieved, and the list of merchants may be filtered based on the blocklist. An authentication question may be presented. The authentication question may relate to the list of merchants. User responses may be received, and response times for the user responses may be measured. Based on the response times and the response times for other users, an average response time for the merchants may be determined. Based on the average response time for a particular merchant exceeding a threshold, the particular merchant may be added to the blocklist.

20 Claims, 6 Drawing Sheets

(51) Int. Cl.
 G06F 21/62 (2013.01)
 G06Q 20/40 (2012.01)
 H04L 9/40 (2022.01)

(56) References Cited

U.S. PATENT DOCUMENTS

| | | |
|---|---|---|
| 2008/0005037 A1 | 1/2008 | Hammad et al. |
| 2014/0096194 A1* | 4/2014 | Bhogavilli .......... H04L 63/0236 |
| | | 726/3 |
| 2016/0358178 A1 | 12/2016 | Ghosh et al. |
| 2018/0114242 A1* | 4/2018 | Lopez ................ G06Q 30/0224 |

* cited by examiner

Which of the following merchants have you made a transaction at in the last 90 days?

| Merchant A | Merchant B | Merchant C |

SUBMIT

Presented Authentication Question
(501)

[1] [1 Second Pause]
[2] [Selection of Merchant A]
[3] [3 Second Pause]
[4] [Selection of Merchant B]
[5] [4 Second Pause]
[6] [Unselection of Merchant B]
[7] [0.5 Second Pause]
[8] [Selection of "Submit" Button]

Candidate Response Timeline
(502)

FIG. 5

AUTHENTICATION QUESTION TOPIC EXCLUSION BASED ON RESPONSE HESITATION

CROSS REFERENCE TO RELATED APPLICATIONS

This application is a continuation of U.S. patent application Ser. No. 17/368,188, filed Jul. 6, 2021, titled Authentication Question Topic Exclusion Based on Response Hesitation. The contents of the above listed application is expressly incorporated herein by reference in its entirety for any and all non-limiting purposes.

FIELD OF USE

Aspects of the disclosure relate generally to account security and audio processing. More specifically, aspects of the disclosure may provide for improvements in the method in which authentication questions are provided for account security by implementing a blocklist based on user response hesitancy such that confusing topics are not used as the basis for authentication questions.

BACKGROUND

As part of determining whether to grant a user access to content (e.g., as part of determining whether to provide a caller access to a telephone system that provides banking information), a user of the user device may be prompted with one or more authentication questions. Such questions may relate to, for example, a password of the user, a personal identification number (PIN) of the user, or the like. Those questions may additionally and/or alternatively be generated based on personal information of the user. For example, when setting up an account, a user may provide a variety of answers to predetermined questions (e.g., "Where was your father born?," "Who was your best friend in high school?"), and those questions may be presented to the user as part of an authentication process. As another example, a commercially-available database of personal information may be queried to determine personal information for a user (e.g., their birthdate, birth state, etc.), and that information may be used to generate an authentication question (e.g., "Where were you born, and in what year?").

As part of authenticating a computing device, information about financial transactions conducted by a user of that computing device may be used to generate authentication questions as well. For example, a user may be asked questions about one or more transactions conducted by the user in the past (e.g., "Where did you get coffee yesterday?," "How much did you spend on coffee yesterday?," or the like). Such questions may prompt a user to provide a textual answer (e.g., by inputting an answer in a text field), to select one of a plurality of answers (e.g., select a single correct answer from a plurality of candidate answers), or the like. In some instances, the user may be asked about transactions that they did not conduct. For example, a computing device may generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user may be able to glean personal information about the legitimate user.

One risk in presenting authentication questions to users is that certain questions may be hard for legitimate users (e.g., users entitled to access an account) to answer. Authentication questions should be difficult for malicious users (e.g., those trying to gain unauthorized access to an account) to answer, but simultaneously relatively easy for legitimate users to answer. That said, a legitimate user may have a hard time answering questions about transactions at merchants that were not memorable and/or which occur infrequently. With that said, it can be difficult to determine which merchants (and/or transactions) are memorable and which ones may be easily forgotten by a legitimate user. For example, even though a user might have been confused by an authentication question, the user might nonetheless be able to (with time) answer the authentication question correctly.

Aspects described herein may address these and other problems, and generally improve the safety of accounts and computer transaction systems by analyzing user response times to questions and excluding topics from future authentication questions based on those response times.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. A user may request access to an account. A list of merchants may be determined based on transaction history associated with the account. For example, a list of merchants where a user has recently conducted a transaction (e.g., a purchase of goods and/or services) may be determined. The list of merchants may be filtered based on a blocklist. That blocklist may indicate one or more merchants where users have a difficult time remembering a transaction, which might be reflected based on an average response time, by users to the question, exceeding some predetermined threshold. Based on the filtered list of merchants, an authentication question may be selected and presented to the user. For example, the question may be provided to the user over an Interactive Voice Response (IVR) call and/or via a website. One or more user responses may be received, and response times may be measured for those user responses. For example, a user may quickly answer a first portion of a question related to a first merchant, but may have difficulty answering a second portion of the same question relating to a second merchant. Based on the average response time for various different users exceeding a threshold, a particular merchant may be added to the blocklist. In this manner, a confusing or otherwise easily confusing merchant may be removed from future lists upon which authentication questions are based.

More particularly, some aspects described herein may provide for a computing device comprising one or more processors; and memory storing instructions that, when executed by the one or more processors, cause the computing device to perform a variety of steps. The computing device may receive, from a user device, a request for access to an account associated with a user. The computing device may retrieve transaction data associated with the user. The computing device may generate a list of merchants to authenticate the user device based on the transaction data. The computing device may retrieve a blocklist that indicates one or more merchants. The computing device may filter the list of merchants by removing any merchants indicated by the blocklist. The computing device may prompt the user device to provide user responses indicating, for each merchant of the list of merchants, whether the user transacted with a corresponding merchant. The computing device may receive the user responses; measure response times for the user responses. The computing device may determine, based on the response times, and based on response times for other users, average response times for the merchants on the list of merchants. The computing device may then, based on the average response time for a particular merchant exceeding a threshold, add the particular merchant to the blocklist. For instance, the blocklist may also be used to filter lists of merchants generated for authenticating other users.

According to some embodiments, measuring the response time may comprise recording a first timestamp for a user response to a first merchant and recording a second timestamp for a user response to a second merchant. In that circumstance, the computing device may measure the response time based on the first timestamp and the second timestamp. The computing device may determine the threshold based on a length of a name of the particular merchant. The computing device may determine a number of words in a name of the particular merchant, then determine an average response time for other merchants having a same number of words in their names. In that situation, the computing device may determine the threshold based on the average response time for other merchants having a same number of words in their names. The computing device may retrieve data indicating a plurality of user response times for other merchants. The plurality of user response times for other merchants may be associated with a plurality of different users. Then, the computing device may determine the threshold based on a distribution of the plurality of user response times for other merchants. The computing device may receive the user responses by receiving a first user response indicating that a user did not transact with a second merchant and receiving a second user response indicating that a user did transact with the second merchant. In that situation, the computing device may flag the second merchant with an indication that the user reconsidered the first user response and, based on the flag indicating that the user reconsidered the first user response, and based on other flags indicating that other users reconsidered other responses for the second merchant, add the second merchant to the blocklist. The computing device may determine that a threshold percentage of other merchants are associated with longer average response times than a third merchant indicated by the blocklist. In that situation, the computing device may remove the third merchant from the blocklist.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts an example of a response timeline; and

DETAILED DESCRIPTION

Figure 1:
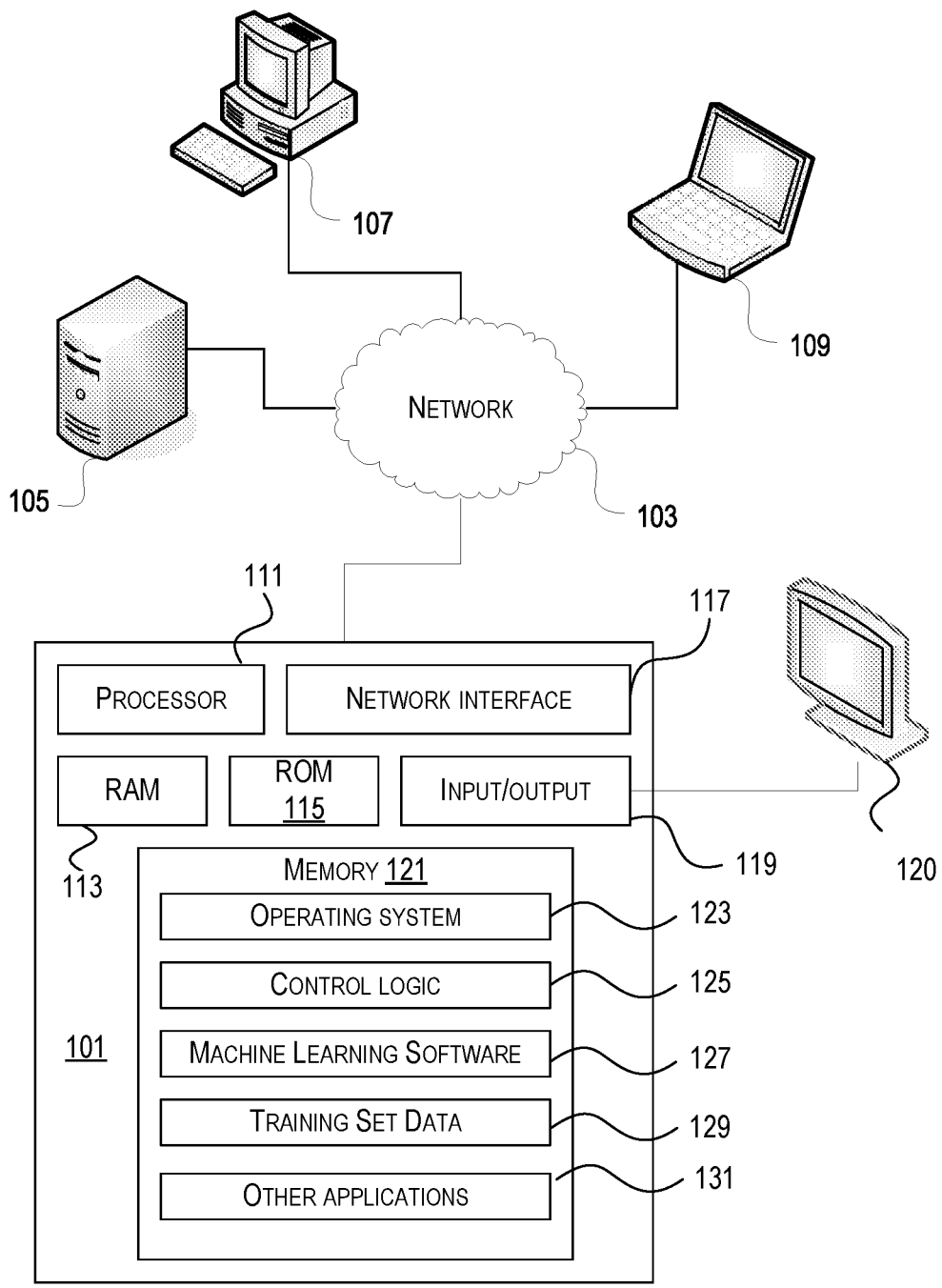
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may prevent questions which confuse legitimate users from being used in authentication processes. This process might be performed by analyzing instances where legitimate users appear to have difficulty answering authentication questions, then using that information to establish a blocklist of topics which may be used to generate authentication questions.

As an example of one problem addressed by the current disclosure, an authentication system may, as part of an authentication process for accessing an account, ask a user to identify certain merchants where they have recently conducted a transaction. That said, because merchant names may vary (e.g., a store may be named "Bob's Coffee" but the legal name may be "Bob's Trading LLC") and/or because certain transactions (e.g., small transactions at a corner store, such as buying water) might not be memorable, a legitimate user may have difficulty answering that authentication question. With that said, this difficulty need not mean that a legitimate user cannot answer the question: rather, the legitimate user may just have to spend a relatively long amount of time considering the answer to the authentication question. This is undesirable, particularly because this confusion might prevent and/or impede legitimate users from accessing their accounts.

Aspects described herein improve the functioning of computers by improving the way in which computers provide authentication questions and protect computer-implemented accounts. The speed and processing complexity of computing devices allows them to present more complicated authentications than ever before, which advantageously can improve the security of sensitive account information. That said, this processing complexity can unintentionally prevent legitimate users from accessing their accounts. Such a result is computationally wasteful at least in that it can cause legitimate users to repeatedly have to access their accounts to gain access, and because it can cause authentication systems to waste computational time generating authentication questions that do not actually improve the security of accounts. The processes described herein improve this process by analyzing the response time of users to identify questions where legitimate users may be unintentionally confused or delayed in response. Such steps cannot be performed by a user and/or via pen and paper at least because the problem is fundamentally rooted in computing processes and requires steps (e.g., the processing of user response time, whether on a website, in audio form, or the like) which cannot be performed by a human being.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
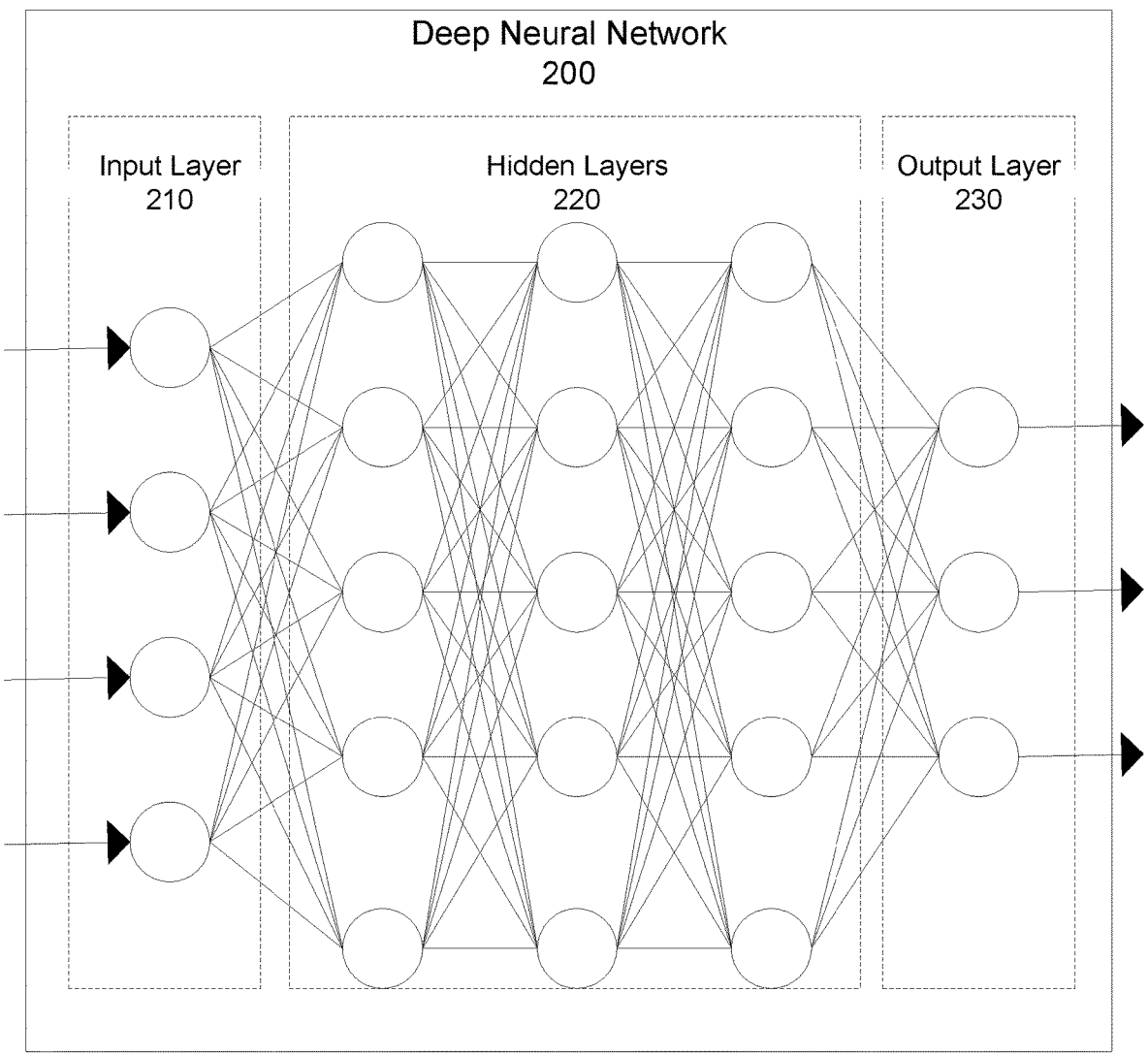
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
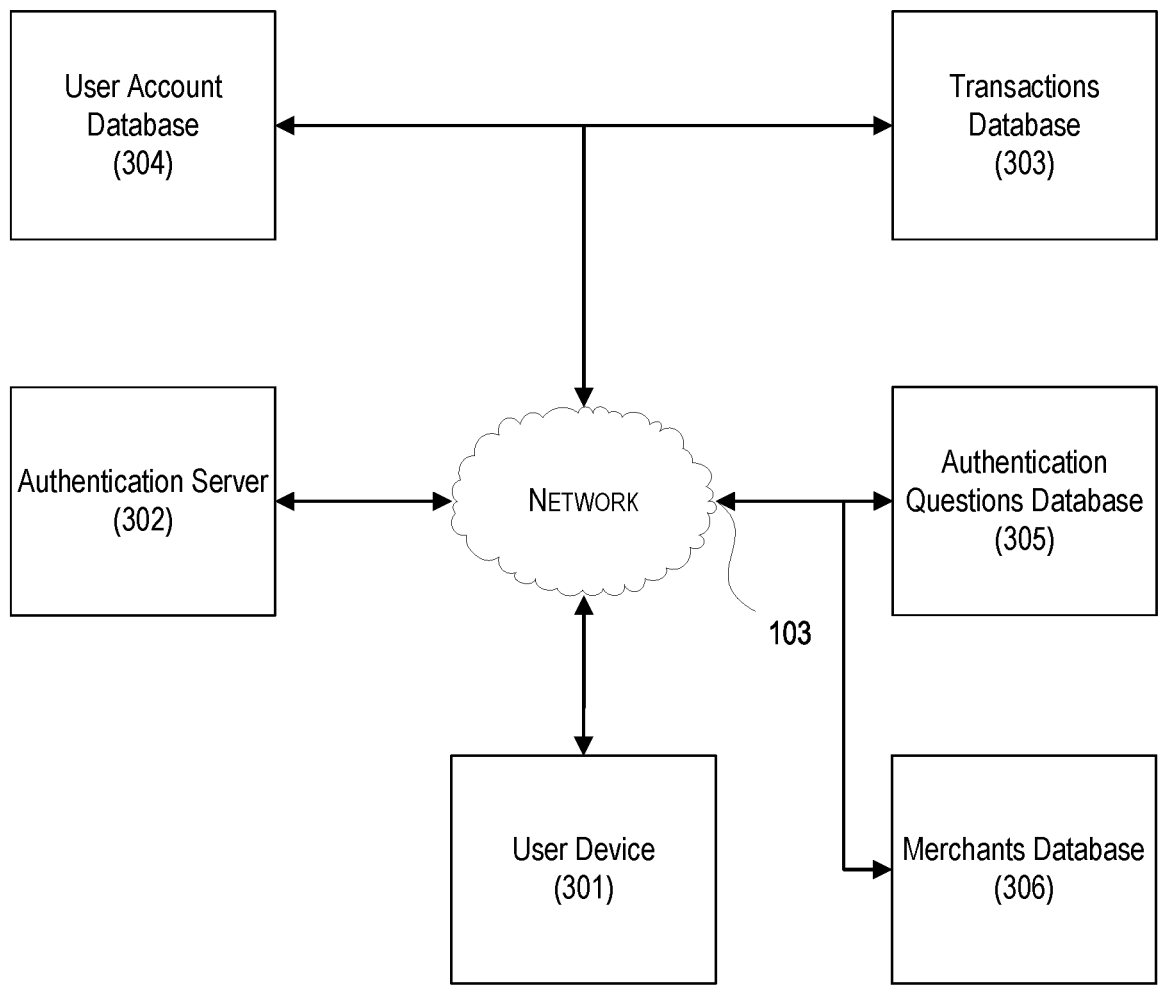
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, and a merchants database 306. The network 103 may be the same or similar as the network 103 of FIG. 1. Each of the user device 301, the authentication server 302, the transactions database 303, the user account database 304, the authentication questions database 305, and/or the merchants database 306 may be one or more computing devices, such as a computing device comprising one or more processors and memory storing instructions that, when executed by the one or more processors, perform one or more steps as described further herein. For example, any of those devices may be the same or similar as the computing devices 101, 105, 107, and 109 of FIG. 1.

As part of an authentication process, the user device 301 may communicate, via the network 103, to access the authentication server 302 to request access (e.g., to a user account). The user device 301 shown here may be a smartphone, laptop, or the like, and the nature of the communications between the two may be via the Internet, a phone call, or the like. For example, the user device 301 may access an IVR system associated with the authentication server 302, and the user device 301 may provide (e.g., over a phone call) candidate authentication credentials to that IVR system (e.g., answers to authentication questions spoken verbally by a user). The authentication server 302 may then determine whether the authentication credentials are valid. For example, the authentication server 302 may compare the candidate authentication credentials received from the user device 301 with authentication credentials stored by the user account database 304. In the case where the communication is an IVR system, the user device 301 need not be a computing device, but may be, e.g., a conventional telephone.

The user account database 304 may store information about one or more user accounts, such as a username, password, demographic data about a user of the account, or the like. For example, as part of creating an account, a user may provide a username, a password, and/or one or more answers to predetermined authentication questions (e.g., "What is the name of your childhood dog?"), and this information may be stored by the user account database 304. The authentication server 302 may use this data to generate authentication questions. The user account database 304 may store demographic data about a user, such as their age, gender, location, occupation, education level, income level, and/or the like.

The transactions database 303 may comprise data relating to one or more transactions conducted by one or more financial accounts associated with a first organization. For example, the transactions database 303 may maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 may be generated based on one or more transactions conducted by one or more users. For example, a new transaction entry may be stored in the transactions database 303 based on a user purchasing an item at a store online and/or in a physical store. As another example, a new transaction entry may be stored in the transactions database 303 based on a recurring charge (e.g., a subscription fee) being charged to a financial account. As will be described further below, synthetic transactions may be based, in whole or in part, on legitimate transactions reflected in data stored by the transactions database 303. In this way, the synthetic transactions may better emulate real transactions.

The account data stored by the user account database 304 and the transactions database 303 may, but need not be related. For example, the account data stored by the user account database 304 may correspond to a user account for a bank website, whereas the financial account data stored by the transactions database 303 may be for a variety of financial accounts (e.g., credit cards, checking accounts, savings accounts) managed by the bank. As such, a single user account may provide access to one or more different financial accounts, and the accounts need not be the same. For example, a user account may be identified by a username and/or password combination, whereas a financial account may be identified using a unique number or series of characters.

The authentication questions database 305 may comprise data which enables the authentication server 302 to present authentication questions. An authentication question may be any question presented to one or more users to determine whether the user is authorized to access an account. For example, the question may be related to personal information about the user (e.g., as reflected by data stored in the user account database 304), may be related to past transactions of the user (e.g., as reflected by data stored by the transactions database 303), or the like. The authentication question may relate to recent merchants where the user has shopped. The authentication questions database 305 may comprise data for one or more templates which may be used to generate an authentication question based on real information (e.g., from the user account database 304 and/or the transactions database 303) and/or based on synthetic information (e.g., synthetic transactions which have been randomly generated and which do not reflect real transactions). The authentication questions database 305 may additionally and/or alternatively comprise one or more static authentication questions, such as an authentication question that is used for a wide variety of users (e.g., "What is your account number?"). An authentication question may correspond to a synthetic transaction (e.g., a transaction which never occurred). For example, a synthetic transaction indicating a $10 purchase at a coffee shop on Wednesday may be randomly generated, and the authentication question could be, e.g., "Where did you spent $10 last Wednesday?," "How much did you spend at the coffee shop last Wednesday?," or the like. In all such questions, the correct answer may indicate that the user never conducted the transaction. As part of generating authentication questions based on synthetic transactions, merchants may be randomly selected from a list of merchants stored by the merchants database 306. Additionally and/or alternatively, as part of generating such authentication questions based on synthetic transactions, real transactions (e.g., as stored in the transactions database 303) may be analyzed. In this manner, real transactions may be used to make synthetic transactions appear more realistic. The authentication questions database 305 may additionally and/or alternatively comprise historical authentication questions. For example, the authentication questions database 305 may comprise code that, when executed, randomly generates an authentication question, then stores that randomly-generated authentication question for use with other users.

The authentication questions stored in the authentication questions database 305 may be associated with varying levels of difficulty. For example, straightforward answers that should be easily answered by a user (e.g., "What is your mother's maiden name?") may be considered easy questions, whereas complicated answers that require a user to remember past transactions (e.g., "Where did you get coffee last week?") may be considered difficult questions.

The merchants database 306 may store data relating to one or more merchants, including indications (e.g., names) of merchants, aliases of the merchants, and the like. That data may be used to generate authentication questions that comprise both correct answers (e.g., based on data from the transactions database 303 indicating one or more merchants where a user has in fact conducted a transaction) and synthetic transactions (e.g., based on data from the merchants database 306, which may be randomly-selected merchants where a user has not conducted a transaction). For example, a computing device may, as part of randomly generating a synthetic transaction using instructions provided by the authentication questions database 305, generate a synthetic transaction by querying the merchants database 306 for a list of merchants, then removing, from that list, merchants represented in the data stored by the transactions database 303.

Having discussed several examples of computing devices which may be used to implement some aspects as discussed further below, discussion will now turn to a method for implementing a merchant blocklist to improve the memorability of authentication questions.

Figure 4:
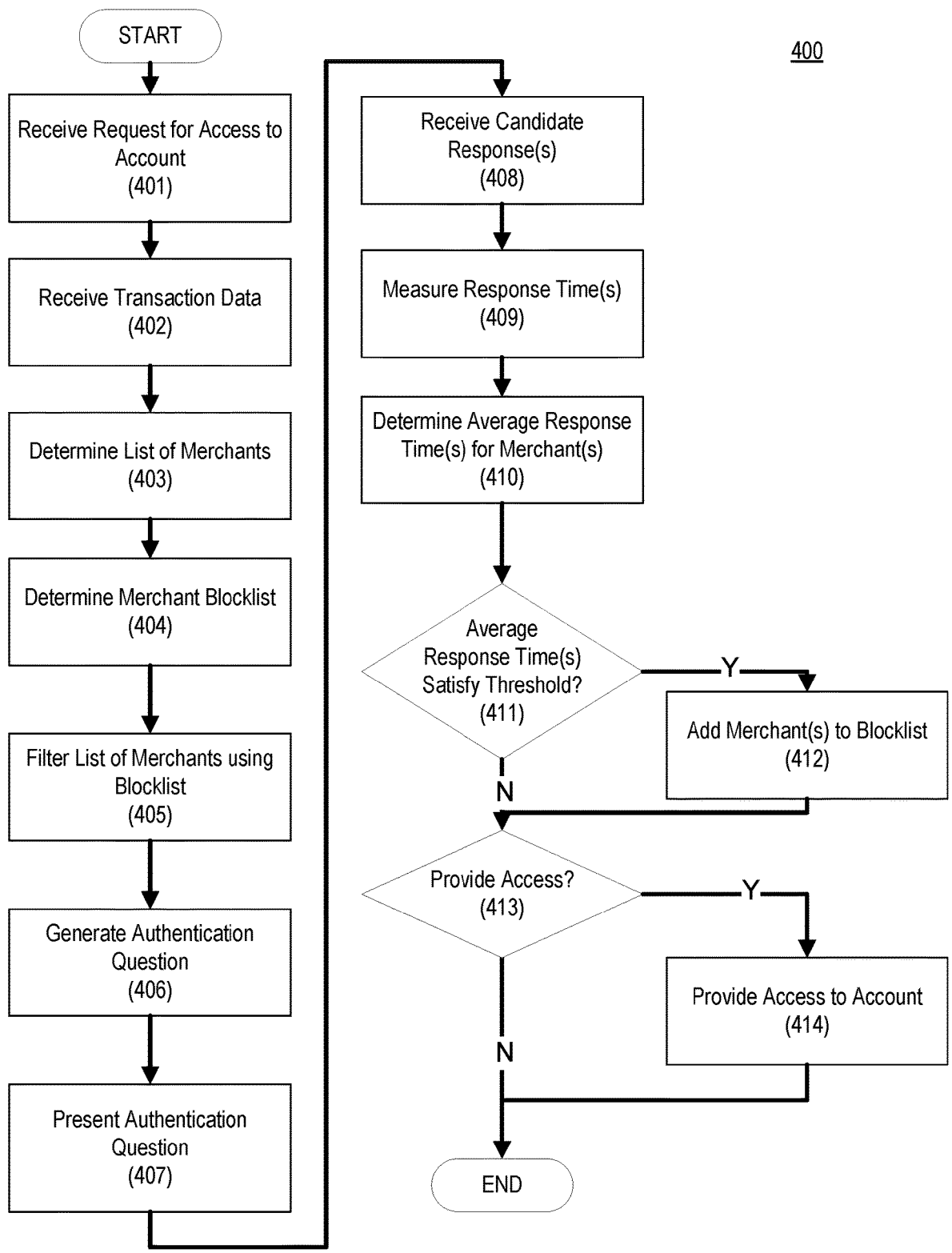
FIG. 4 depicts a flow chart comprising steps which may be performed for implementing a merchant blocklist when generating authentication questions.

FIG. 4 illustrates a method 400 for implementing a merchant blocklist to improve the memorability of authentication questions in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, the user device 301, authentication server 302, transactions database 303, user account database 304, authentication questions database 305, merchants database 306, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired. For example, steps 410 and 411 may be omitted.

In step 401, the computing device may receive a request for access to an account. For example, the computing device may receive, from a user device, a request for access to an account associated with a user. For example, the computing device may receive, from a user device, a request for access to an account associated with one or more authorized users. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user may call an IVR system and be identified (e.g., using caller ID) by their telephone number, which may be used to query the user account database 304 for a corresponding account.

In step 402, the computing device may receive transaction data. The transaction data may be received from the transactions database 303, and may relate to a particular account. For example, the computing device may retrieve transaction data associated with the user. The transaction data may indicate a plurality of transactions. For example, the transaction data may indicate a plurality of different transactions (e.g., purchases of goods and/or services) associated with an account over a period of time (e.g., the last month). Each transaction of the plurality of transactions may be associated with a merchant and associated with at least one of the plurality of authorized users. For example, each of the plurality of transactions may have been conducted at one or more merchants (e.g., a coffee shop, a shopping mall, etc.) and may have been conducted by one or more of a plurality of different authorized users of the account (e.g., one or more of three different users that share a checking account).

In step 403, the computing device may determine a list of merchants. A list of merchants may correspond to one or more merchants indicated by the transaction data. For example, the computing device may generate a list of merchants to authenticate the user device based on the transaction data. The list of merchants may be, for example, the last ten merchants where a user has recently conducted a transaction. In this manner, the list of merchants need not be exhaustive of all merchants indicated by the transaction data, and may instead reflect a predetermined number of merchants (e.g., the last ten merchants) or all merchants over a period of time (e.g., all merchants associated with transactions occurring in the last week). The list of merchants may be determined based on the transaction data received in step 402 and/or data stored by the merchants database 306. The list of merchants need not be in any particular format. For example, the list of merchants need not be an ordered list, and instead may be an unordered collection of merchant names and/or other similar merchant identifiers.

The list of merchants need not exclusively contain merchants where the account has been used to conduct a transaction. For example, the list of merchants may comprise one or more merchants (e.g., from the merchants database 306) where the user did not conduct a transaction. In this manner, and as will be described below, an authentication question may ask a user to identify, from the list of merchants, which merchants the user has used the account (e.g., the account referenced in step 401) to conduct a transaction.

In step 404, the computing device may determine a merchant blocklist. A merchant blocklist may indicate one or more merchants regarding which authentication questions should not be generated. For example, the computing device may retrieve a blocklist that indicates one or more merchants. The merchant blocklist may comprise merchants that are not readily remembered by users for a wide variety of reasons. For example, the merchant blocklist may comprise merchants whose legal name (e.g., "Joe's Sandwich Shop LLC") is remarkably different than the name used by the merchant (e.g., "The Sandwich Shack"), such that users might not readily recognize the legal name. As another example, the merchant blocklist may comprise merchants (e.g., corner stores, gas stations) where users may remember the act of the transaction itself, but might not particularly remember the merchant where the transaction occurred. Like the list of merchants determined in step 403, the merchant blocklist 404 need not be in any particular order, and need not be an ordered list. For example, the merchant blocklist 404 may be an unordered collection of merchant names and/or other similar merchant identifiers.

The merchant blocklist may be used to filter lists of merchants generated for authenticating a plurality of users, including other users. In other words, the merchant blocklist may be a universal blocklist that prevents merchants from being used to form authentication questions for a wide variety of users. Additionally and/or alternatively, the merchant blocklist may be individual to a particular user, such as a user associated with the account referenced in step 401. In such a circumstance, each user may have their own blocklist comprising merchants which the user may readily not remember. Such a blocklist may be generated based on demographic data relating to the user (e.g., as reflected by demographic data stored by the user account database 304). For example, the blocklist may be generated based on a geographical location of a user, the age of the user, the gender of the user, or the like.

The merchant blocklist may be generated, in whole or in part, using machine learning techniques. A machine learning model (e.g., executing via the machine learning software 127 and/or the deep neural network 200) might be trained to identify confusing merchants based on training data that indicates, for a plurality of different merchants (e.g., merchant names, merchant locations, merchant categories), a likelihood that a user would have difficulty remembering whether they shopped at the merchant. In this manner, the trained machine learning model might be configured to identify whether a merchant is likely to be memorable for a user. The trained machine learning model might be provided input data comprising one or more merchants (e.g., reflected by data stored by the merchants database 306), and trained machine learning model might provide output data indicating, for each of the one or more merchants, a likelihood that a user would remember the merchant. Based on these likelihood values, the merchants might be added to the merchant blocklist. For example, if a merchant is particularly unmemorable (e.g., the output of the trained machine learning model satisfies a threshold), then it might be added to the merchant blocklist.

In step 405, the computing device may filter the list of merchants determined in step 403 based on the blocklist determined in step 404. Filtering the list of merchants may comprise removing, from the list of merchants, one or more merchants indicated by the merchant blocklist determined in step 404. For example, the computing device may filter the list of merchants by removing any merchants indicated by the blocklist. Through this filtering, the list of merchants may be filtered in a manner such that remaining merchants in the list of merchants are ones that have not (yet) been determined to be difficult for a user to remember.

In step 406, the computing device may generate an authentication question. The authentication question may be generated based on instructions stored by the authentication questions database 305. The authentication question may relate to one or more of the merchants in the filtered list of merchants. For example, the authentication question may ask a user to confirm whether they recently shopped at a merchant. The merchant in that authentication question may be one of the merchants in the filtered list of merchants. As another example, the authentication question may ask the user to identify, for each of the list of merchants, one or more merchants where the user did or did not conduct a transaction with an account. In such a circumstance, the filtered list of merchants may comprise merchants where the account has been used to conduct a transaction (e.g., as reflected by transaction data stored by the transactions database 303 and retrieved as part of step 402) and merchants where the account has not been used to conduct a transaction (e.g., randomly-selected merchants from the merchants database 306).

In step 407, the computing device may present the authentication question. Presenting the authentication question may comprise causing the authentication question to be displayed (e.g., in a user interface, such as on a website) or presented (e.g., in audio or video form). Presenting the authentication question may comprise presenting a plurality of different answer options for a user. For example, the computing device may prompt the user device to provide user responses indicating, for each merchant of the list of merchants, whether the user transacted with a corresponding merchant.

In step 408, the computing device may receive one or more candidate responses to the authentication question. The candidate response may comprise an indication of one or more answers to the authentication question presented in step 407. For example, the computing device may receive the user responses. As another example, where an authentication question comprises one or more answers, the candidate response may comprise a selection of at least one of the one or more answers. As yet another example, in the case of a telephone call, the candidate response may comprise an oral response to an authentication question provided using a text-to-speech system over the call.

In step 409, the computing device may measure response time(s) corresponding to the candidate responses received in step 408. Measuring the response time may comprise calculating how long it took for a user to provide one or more responses to one or more authentication questions. For example, the computing device may measure response times for the user responses. A response time may be represented as quantitative data (e.g., as a number of microseconds and/or seconds) or qualitative data (e.g., "long," "short," "quick," or the like). The measurement may be relative to a time when the authentication question was presented. For example, the time when an authentication question is presented may be understood to be the start of measurement (e.g., some time measured in any time increment, such as the wall clock time and/or 00:00:00), whereas the time when an answer to the authentication question is received may be understood to be the end of that measurement (e.g., some time later as represented in any time increment, such as 00:01:29).

The response time(s) need not correspond to interaction with user interface elements. For example, if an authentication question is presented in an audio format (e.g., over a telephone call), then the responses from the user might also be received in an audio format (e.g., by the user speaking over the telephone). Thus, for example, a user response might comprise any form of user response, such as a user making a motion and/or sound, selecting an object in a user interface, or the like.

The computing device may measure the response time using timestamps. Such timestamps may be particularly useful where an authentication question presents a number of different options, such that a user may be providing multiple answers (e.g., indications of different merchants) to the same question. For example, an authentication question may ask a user to identify, from five different merchants, which merchants they shopped at last week. The computing device may record a first timestamp for a user response to a first merchant. That timestamp might be a zero value (e.g., a stopwatch-style counter, such as 00:00:00) and/or a time (e.g., 1:05 PM EST). For example, after the authentication question is presented (timestamp 00:00:00, which may correspond to 1:00:01 EST), the user may select a first merchant at a later time (timestamp 00:02:19, which may correspond to 1:02:20 EST). The computing device may then record a second timestamp for a user response to a second merchant. For example, after the user selects the first merchant (timestamp 00:02:19, as indicated above), the user may select a second merchant at a later time (timestamp 00:03:40, which may correspond to 1:03:41 EST). The computing device may then measure the response time based on the first timestamp and the second timestamp. For example, the difference between the selection of the first merchant and the second merchant is 00:01:21, such that it took two minutes and nineteen seconds for the user to select the first merchant but only one minute and twenty-one seconds for the user to select the second merchant. In such a circumstance, the computing device may recognize that it took the user a relatively longer time to select the first merchant as compared to the time it took for the user to select the second merchant.

In step 410, the computing device may determine average response times for one or more merchants. The computing device may determine, for each merchant of one or more merchants, how long it takes, on average, for a user to answer an authentication question involving that merchant. For example, the computing device may determine, based on the response times, and based on response times for other users, average response times for the merchants on the list of merchants. In this manner, the computing device may identify one or more merchants where, on average, users take a long time to answer authentication questions. Such a long time may reflect uncertainty on the part of a user: for example, if a merchant is not particularly memorable and/or if the merchant's name is confusing, a user may have difficulty remembering whether they shopped at the merchant, and thus the user may take a relatively long time to answer an authentication question about that merchant.

Average response times might be determined for different groups of users. For example, average response times might be calculated for different segments of users based on, e.g., their geographic locations, their ages, their income levels, or the like. In this manner, for example, a plurality of different average response times for the same authentication question might be determined, each corresponding to a plurality of different demographic categories (e.g., ages, genders, geographic locations, etc.).

In step 411, the computing device may determine whether one or more of the average response times determined in step 410 and corresponding to one or more merchants satisfy a threshold. One or more of the average response times may satisfy the threshold if, for example, the threshold is an amount of time (e.g., five seconds), and the average response time(s) are longer than the amount of time (e.g., longer than five seconds). In this manner, the computing device may determine that the one or more of the average response times are too long. The threshold may be set by an administrator and/or may be dynamically generated by the length of the merchant name, the demographics of the user (e.g., if they are older, such that they may speak more slowly when responding to an IVR system), or the like. If one or more of the average response times for a merchant satisfies a threshold, the method 400 may proceed to step 412. Otherwise, the method 400 proceeds to step 413.

The threshold may be based on demographics of the user. Broadly, certain types of users might take a longer (and/or shorter) time to answer questions as compared to other users. For example, older users might speak more carefully and/or slowly when responding to an IVR system, such that those users might, on average, take a longer time to answer a question than relatively younger users. In that example, the threshold for older users might be configured to be more permissive (e.g., permit longer average response times) for older users than younger users. To facilitate this functionality, the average response times determined in step 410 might be segmented into different demographics (e.g., an average response time for different age categories, different geographic locations, different income levels), and different thresholds might be applied to each segment of the average response times. In this manner, a merchant might be added to a blocklist (as described in more detail below) for only certain demographics of user.

The threshold may be based on one or more properties of the merchant, such as a length of the merchant name. In general, it may be harder for a user to remember whether they shopped at a merchant if the merchant's name is particularly long and/or convoluted. As such, the computing device may determine a threshold based on the length of a name of a particular merchant. For example, the computing device may determine the threshold based on a length of a name of the particular merchant. For example, a five-word merchant name may be associated with a threshold of five seconds, whereas a two-word merchant name may be associated with a threshold of three seconds.

The threshold may be based on an average response time for other merchants having a similar name length. The computing device may analyze merchant names having a similar length, then use the average response times for those merchants to inform how long it should take a user to answer an authentication question pertaining to a merchant having a similarly-long name. For example, the computing device may retrieve data indicating a plurality of user response times for other merchants. In that circumstance, the plurality of user response times for other merchants may be associated with a plurality of different users. Then, the computing device may determine the threshold based on a distribution of the plurality of user response times for other merchants. For example, the threshold may be based on an average response time, for the plurality of different users, to questions involving the other merchants. As another example, the computing device may retrieve data indicating a plurality of user response times for other merchants. In that circumstance, the plurality of user response times for other merchants may be associated with a plurality of different users. Then, the computing device may determine the threshold based on a distribution of the plurality of user response times for other merchants.

The threshold may be based on demographics of a user associated with the account. Some users (e.g., elderly users) may speak more slowly than others. Accordingly, the threshold may be based, in part, on the demographic data (e.g., stored in the user account database 304) associated with the account. For example, based on determining that the authentication question pertains to an account associated with elderly authorized users, the threshold may be relatively higher (e.g., permit slower responses) than it would be for younger authorized users.

The threshold may be based on output from a machine learning model. A machine learning model (e.g., executing via the machine learning software 127 and/or the deep neural network 200) might be trained to predict how long an average user should take to answer a question relating to a merchant. For example, the machine learning model might be trained using training data that comprises data indicating, for each of a plurality of different merchants, an average time that one or more different users took to answer authentication questions relating to a respective merchant. The trained machine learning model might be provided, as input, an indication of a first merchant. The trained machine learning model might be configured to provide, as output, an estimated time that a user should take in answering a question related to that first merchant. The threshold might be based on the estimated time. For example, if the machine learning model indicates that the average user should take eight seconds to answer an authentication question related to "Merchant A," the threshold might be some larger value, such as sixteen seconds.

The threshold may be based on the difficulty of the authentication question generated as part of step 406. Because some authentication questions may be longer and/or more complicated than others, it may take a user different times to answer those authentication questions. For example, a user may take a second longer to read and consider the question "Which stores did you shop at last Tuesday in the afternoon with your debit card?" than it does to read and consider the question "Select where you've shopped recently." As such, based on the difficulty of the authentication question, the threshold may be modified. For example, for a harder question, the threshold may be relatively higher (e.g., permit slower responses) than it would be for easier questions.

In step 412, the computing device may add the merchant from step 411 to a blocklist. For example, based on the average response time for a particular merchant exceeding a threshold, the computing device may add the particular merchant to the blocklist. In this manner, the computing device may prevent the merchant from being used as part of authentication questions in the future, whether for the same user or for different users/accounts.

Merchants might be added to the blocklist for particular types of users. As indicated above, different thresholds might be maintained for different demographic categories of users. Based on an average response time for a particular demographic category (e.g., men aged forty-five to sixty years old in Atlanta, Georgia) satisfying a threshold particular to that category (e.g., sixty seconds), the merchant might be added to the blocklist for that particular demographic category. In this manner, a merchant might be presented for other demographic categories. This might advantageously create a blocklist that better reflects the memory of different segments of the population: for example, the blocklist may thereby reflect the fact that certain demographics may have an easier time remembering certain merchants as compared to others.

Merchants may later be removed from the blocklist. The computing device may remove a merchant from the blocklist after a period of time has elapsed because, e.g., intervening circumstances (e.g., the growing popularity of the merchant) may make the merchant more or less memorable than it was before. The merchant may also be removed from the blocklist based on activity involving other merchants. For example, the computing device may determine that a threshold percentage of other merchants are associated with longer average response times than a third merchant indicated by the blocklist. In that situation, the computing device may remove the third merchant from the blocklist. In this manner, the computing device may recognize that, though users may take a long time to answer an authentication question involving that particular merchant, such a long time may be normal given the average response time for other merchants.

A merchant may additionally and/or alternatively be added to a blocklist if it appears that a legitimate user reconsidered their answer, even if the user did not necessarily hesitate when reconsidering their answer. In some circumstances, a user may ultimately answer an authentication question correctly and/or quickly, but the manner in which they answer (e.g., switching back and forth between two options) may suggest that the authentication question was confusing and/or otherwise difficult to answer. As such, the computing device may identify such circumstances for the purposes of avoiding user confusion and/or hesitancy. The computing device may receive a first user response indicating that a user did not transact with a second merchant and may receive a second user response indicating that a user did transact with the second merchant. In other words, the computing device may receive an indication that the user was uncertain regarding their answer regarding a particular merchant (e.g., the second merchant). In such a circumstance, the computing device may flag the second merchant with an indication that the user reconsidered the first user response. Then, based on the flag indicating that the user reconsidered the first user response, and based on other flags indicating that other users reconsidered other responses for the second merchant, the computing device may add the second merchant to the blocklist. In this manner, even if the user (and/or different users) were ultimately correct in their answers, and even if the user (and/or different users) were relatively quick in providing those answers, the merchant may nonetheless be added to the blocklist where the computing device receives an indication that the user(s) may have had to reconsider their answers.

In step 413, the computing device may determine whether to provide access to the account. Determining whether to provide access to the account may be based on the user answering a threshold number of authentication questions correctly. For example, as part of generating the authentication question in step 406, the computing device may have determined which answer(s) are correct, such that determining whether to provide access to the account may be based on a user selecting the correct answer(s). If the computing device decides to provide access to the account, the method 400 may proceed to step 414. Otherwise, the method 400 may end.

In step 414, the computing device may provide access to the account. Access to the account may be provided by, e.g., providing a user device access to a protected portion of a website, transmitting confidential data to a user device, allowing a user to request, modify, and/or receive personal data (e.g., from the user account database 304 and/or the transactions database 303), or the like.

FIG. 5 depicts a presented authentication question 501 and a candidate response timeline 502 that is based on candidate responses received in response to the presented authentication question 501. The presented authentication question 501, which may have been generated as part of step 406 and presented as part of step 407 of the method 400 of FIG. 4, asks a user to select, from three different merchants, which merchant(s) they have made a transaction at in the last ninety days. In this manner, the user may be prompted to select one, two, three, and/or no merchants in response to the presented authentication question 501, then select a submit button.

The candidate response timeline 502 indicates that, with respect to the presented authentication question 501, a user took one second before selecting Merchant A, took three seconds before selecting Merchant B, took four seconds before unselecting Merchant B, then took half a second before selecting the "Submit" button. In this circumstance, the computing device may determine that the user took one second to select Merchant A and reconsidered their answer regarding Merchant B. If the threshold for answering Merchant A is 0.5 seconds, for example, then Merchant A may be added to the blocklist in accordance with steps 411 and 412 of the method 400 of FIG. 4. On the other hand, if the threshold is two seconds, then Merchant A might not be added to the blocklist. As indicated above, Merchant B might also be added to the blocklist depending on whether the computing device determines that the selecting and unselecting of the Merchant B option suggests user uncertainty.

Figure 6:
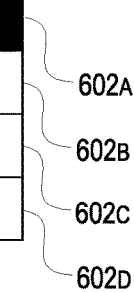
FIG. 6 depicts an example of a merchant blocklist.

FIG. 6 depicts a merchant blocklist 601. The merchant blocklist 601, for the purposes of illustration, comprises a table. The merchant blocklist 601 comprises a header row 602a that indicates that a first column corresponding to a merchant identifier, a second column corresponding to a threshold response time, and a third column corresponding to an average response time for the merchant. The first row 602b indicates that, for the merchant "Joe's Convenience," the threshold is two seconds, but users take an average of ten seconds to answer questions regarding that merchant. The second row 602c indicates that, for the merchant "Bob's Grocery," the threshold is four seconds, but users take an average of one minute to answer questions regarding that merchant. The third row 602d indicates that, for the merchant "Tonya's Gas," the threshold is ten seconds, but users take an average of fifteen seconds to answer questions regarding that merchant. In all such cases, the fact that the average response time is greater than the threshold response time may indicate why the merchants are included in the merchant blocklist 601.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, from a user device, a request for access to an account associated with a user;
   generating a list of merchants to authenticate the user device based on transaction data associated with the user;
   prompting the user device to provide user responses indicating, for each merchant of the list of merchants, whether the user transacted with a corresponding merchant;
   measuring response times for the user responses;
   determining, based on the response times, and based on response times for other users, average response times for the merchants on the list of merchants; and
   based on the average response time for a particular merchant exceeding a threshold, adding the particular merchant to a merchant blocklist.

2. The method of claim 1, further comprising:
   filtering the list of merchants based on the merchant blocklist.

3. The method of claim 1, wherein measuring the response times comprises:
   recording a first timestamp for a user response to a first merchant;
   recording a second timestamp for a user response to a second merchant; and
   measuring the response times based on the first timestamp and the second timestamp.

4. The method of claim 1, further comprising:
   determining the threshold based on a length of a name of the particular merchant.

5. The method of claim 1, further comprising:
   determining a number of words in a name of the particular merchant;
   determining an average response time for other merchants having a same number of words in their names; and
   determining the threshold based on the average response time for other merchants having a same number of words in their names.

6. The method of claim 1, further comprising:
   retrieving data indicating a plurality of user response times for other merchants, wherein the plurality of user response times for other merchants are associated with a plurality of different users; and
   determining the threshold based on a distribution of the plurality of user response times for other merchants.

7. The method of claim 1, further comprising:
   receiving the user responses by:
      receiving a first user response indicating that the user did not transact with a second merchant; and
      receiving a second user response indicating that the user did transact with the second merchant,
   the method further comprising:
      flagging the second merchant with an indication that the user reconsidered the first user response; and
      based on the flag indicating that the user reconsidered the first user response, and based on other flags indicating that other users reconsidered other responses for the second merchant, adding the second merchant to the merchant blocklist.

8. The method of claim 1, further comprising:
determining that a threshold percentage of other merchants are associated with longer average response times than a third merchant indicated by the merchant blocklist; and
removing the third merchant from the merchant blocklist.

9. A computing device comprising:
one or more processors; and
memory storing instructions that, when executed by the one or more processors, cause the computing device to:
receive, from a user device, a request for access to an account associated with a user;
generate a list of merchants to authenticate the user device based on transaction data associated with the user;
prompt the user device to provide user responses indicating, for each merchant of the list of merchants, whether the user transacted with a corresponding merchant;
measure response times for the user responses;
determine, based on the response times, and based on response times for other users, average response times for the merchants on the list of merchants; and
based on the average response time for a particular merchant exceeding a threshold, add the particular merchant to a merchant blocklist.

10. The computing device of claim 9, wherein the instructions, when executed by the one or more processors, cause the computing device to:
filter the list of merchants based on the merchant blocklist.

11. The computing device of claim 9, wherein the instructions, when executed by the one or more processors, cause the computing device to measure the response times by causing the computing device to:
record a first timestamp for a user response to a first merchant;
record a second timestamp for a user response to a second merchant; and
measure the response times based on the first timestamp and the second timestamp.

12. The computing device of claim 9, wherein the instructions, when executed by the one or more processors, further cause the computing device to:
determine the threshold based on a length of a name of the particular merchant.

13. The computing device of claim 9, wherein the instructions, when executed by the one or more processors, further cause the computing device to:
determining a number of words in a name of the particular merchant;
determining an average response time for other merchants having a same number of words in their names; and
determining the threshold based on the average response time for other merchants having a same number of words in their names.

14. The computing device of claim 9, wherein the instructions, when executed by the one or more processors, further cause the computing device to:
retrieve data indicating a plurality of user response times for other merchants, wherein the plurality of user response times for other merchants are associated with a plurality of different users; and
determine the threshold based on a distribution of the plurality of user response times for other merchants.

15. One or more non-transitory computer-readable media storing instructions that, when executed by one or more processors, cause a computing device to:
receive, from a user device, a request for access to an account associated with a user;
generate a list of merchants to authenticate the user device based on transaction data associated with the user;
prompt the user device to provide user responses indicating, for each merchant of the list of merchants, whether the user transacted with a corresponding merchant;
measure response times for the user responses;
determine, based on the response times, and based on response times for other users, average response times for the merchants on the list of merchants; and
based on the average response time for a particular merchant exceeding a threshold, add the particular merchant to a merchant blocklist.

16. The one or more non-transitory computer-readable media of claim 15, wherein the instructions, when executed by the one or more processors, cause the computing device to:
filter the list of merchants based on the merchant blocklist.

17. The one or more non-transitory computer-readable media of claim 15, wherein the instructions, when executed by the one or more processors, cause the computing device to measure the response times by causing the computing device to:
record a first timestamp for a user response to a first merchant;
record a second timestamp for a user response to a second merchant; and
measure the response times based on the first timestamp and the second timestamp.

18. The one or more non-transitory computer-readable media of claim 15, wherein the instructions, when executed by the one or more processors, further cause the computing device to:
determine the threshold based on a length of a name of the particular merchant.

19. The one or more non-transitory computer-readable media of claim 15, wherein the instructions, when executed by the one or more processors, further cause the computing device to:
determining a number of words in a name of the particular merchant;
determining an average response time for other merchants having a same number of words in their names; and
determining the threshold based on the average response time for other merchants having a same number of words in their names.

20. The one or more non-transitory computer-readable media of claim 15, wherein the instructions, when executed by the one or more processors, further cause the computing device to:
retrieve data indicating a plurality of user response times for other merchants, wherein the plurality of user response times for other merchants are associated with a plurality of different users; and
determine the threshold based on a distribution of the plurality of user response times for other merchants.

\* \* \* \* \*